(12) United States Patent
Jenne et al.

(10) Patent No.: US 6,245,217 B1
(45) Date of Patent: *Jun. 12, 2001

(54) REGENERATIVE THERMAL OXIDATION SYSTEM FOR TREATING ASPHALT VAPORS

(75) Inventors: Richard A. Jenne, Gahanna; Kenneth E. Carney, Granville, both of OH (US)

(73) Assignee: Owens Corning Fiberglas Technology, Summit, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,770

(22) Filed: May 24, 1999

Related U.S. Application Data

(62) Division of application No. 08/905,358, filed on Aug. 4, 1997, now Pat. No. 5,922,290.

(51) Int. Cl.$^7$ .................................................. C10C 1/20
(52) U.S. Cl. ............................................. 208/44; 208/45
(58) Field of Search ................... 208/40, 45, 13

(56) References Cited

U.S. PATENT DOCUMENTS

| | | | | |
|---|---|---|---|---|
| 4,511,456 | * | 4/1985 | Izumi | 208/44 |
| 5,262,131 | * | 11/1993 | Bayer et al. | 422/175 |
| 5,573,656 | * | 11/1996 | Santos | 208/13 |
| 5,611,910 | * | 3/1997 | Marzari et al. | 208/44 |
| 6,036,843 | * | 3/2000 | Marzari et al. | 208/44 |

OTHER PUBLICATIONS

Biotox Regeneratie Oxidation Process, 1994, Biothermic.

Guy Drouin, Jean Gravel and Valya Papadopoullos, "VOC and COC Emission Control By Regenerative Thermal Oxidation", Jun. 23,–28, 1996, pp. 1–10.

Biotox Regeneratie Oxidation Process, BPCO, EMCO Division, Ville LaSalle (Quebec) Canada, Process Data Sheets.

Sophie Kneisel, "R&D Equals Profits In Biotox Equation", *Consulting Engineer*, Nov./Dec. 1994.

* cited by examiner

*Primary Examiner*—Helane E. Myers
(74) *Attorney, Agent, or Firm*—Inger H. Eckert; James J. Dottavio

(57) ABSTRACT

A regenerative thermal oxidation system for reducing the VOC content of asphalt vapors.

17 Claims, 4 Drawing Sheets

REGENERATIVE THERMAL OXIDATION SYSTEM FOR TREATING ASPHALT VAPORS

This is a Divisional of U.S. patent application Ser. No. 08/905,358, filed on Aug. 4, 1997 now U.S. Pat. No. 5,922,290.

The present invention relates in general to the field of pollution abatement equipment. Specifically, the present invention pertains to a regenerative thermal oxidation system for reducing atmospheric emissions of volatile, organic compounds associated with the manufacture, shipping and storage of asphalt materials.

BACKGROUND OF THE INVENTION

Asphalts are well known and widely used in a variety of products. While asphalts are primarily composed of high molecular weight hydrocarbons, they invariably contain minor amounts of low molecular weight hydrocarbons exhibiting substantial volatility. As such, the manufacture, storage and transportation of asphalt materials present opportunities for escape of such volatile, organic components (VOCs) into the atmosphere, as well as the accumulation of highly explosive vapors in storage facilities and processing equipment.

In view of the environmental and safety hazards such VOCs present, methods to control their accumulation and emission have been developed. Typically, these involve drawing the vapors into a flame incinerator where they are combusted. Unfortunately, the incineration of such VOCs by a flame burner is expensive, and the temperatures reached in such incinerators often favor the formation of undesirable nitrous oxides.

Although regenerative thermal oxidizers (RTOs) are well known and used in various industries for the treatment of effluent gas streams to reduce VOCs, their usefulness in conjunction with the manufacture, storage and transportation of asphalt has not previously been fully appreciated due, at least in part, to the failure of commercially available RTO devices to accommodate the relatively high content of condensable vapors or blowing distillate oil (BD oil) entrained in the gas stream drawn off from such operations. When asphalt vapors are introduced directly into an RTO unit, the BD oil contained in such streams quickly forms a layer of coke on the heat transfer elements of the RTO unit which reduces its effectiveness. As such, the frequent cleaning and/or replacement of the heat transfer elements in such units has previously rendered their use in conjunction with the manufacture of asphalt uneconomical. Although advances in this regard have been made by incorporating a cyclone separator upstream of the RTO unit to remove BD oils, such as in the BIOTOX systems commercially available from BIOTHERMICA, the performance of such separators at low or varying flow rates, or for removing particles of varying sizes, is less than optimum. Accordingly, a need exists for a RTO system capable of effectively removing the condensable oils and oxidizing the VOC's contained in asphalt vapors over a wide range of particle sizes and flow rates. This need is met by the invention described herein.

SUMMARY OF THE INVENTION

The present invention provides a regenerative thermal oxidation system especially adapted to reduce the VOC content of vapors associated with the manufacture, storage and transportation of asphalt. The RTO system comprises a separator to remove BD oils from the vapors, and an RTO unit to oxidize the VOCs contained in the vapors. The system is capable of effective operation at over widely varying flow rates which makes it ideally suited to intermittent use as may be encountered in connection with a truck loading station or a portable unit. Moreover, the separation unit of the system advantageously removes entrained or condensed oils from the vapor stream effectively over a wide range of particle sizes, which reduces fouling of the heat transfer elements of the RTO unit and reduces the formation of sulfur dioxide. Additionally, the RTO unit may be electrically powered, which reduces the nitrous oxide emissions below the levels typically encountered with flame incinerators.

DETAILED DESCRIPTION AND PREFERRED EMBODIMENTS OF THE INVENTION

The present invention provides a regenerative thermal oxidation system useful in the reduction of VOC emissions associated with the manufacture, storage and transportation of asphalt materials. In particular, the present invention provides an RTO system that reliably separates out the BD oils from the vapor stream even at low flow rates to reduce the undesirable coking of the equipment caused by such oils. Removal of the BD oils prior to oxidation of the vapors further reduces the formation of sulfur dioxide emissions. Moreover, because the RTO system of the invention is capable of destroying the VOC components of the effluent stream at much lower temperatures than utilized in flame burner incinerators, the RTO system of the invention further reduces the formation of nitrous oxide emissions.

Figure 1:
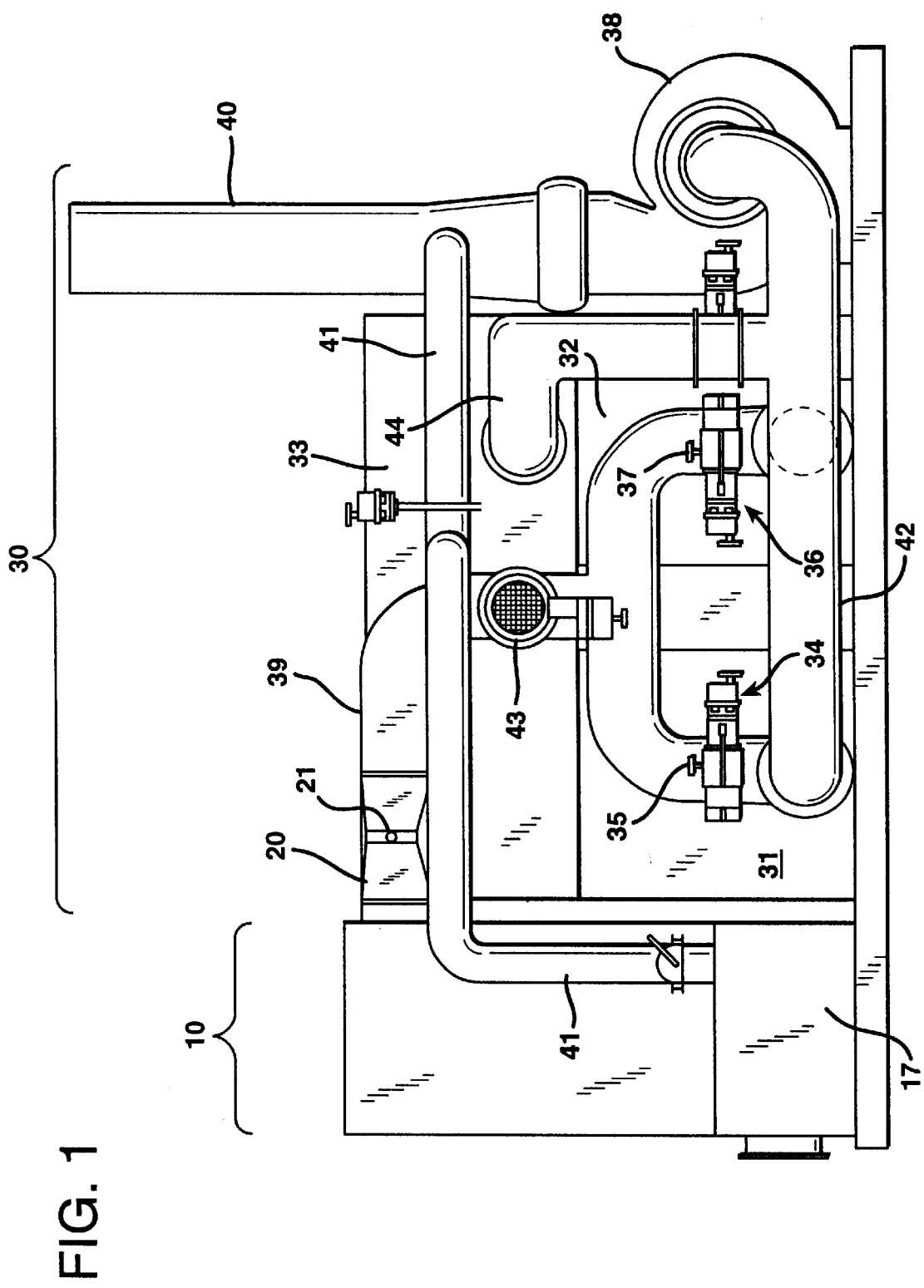
FIG. 1 is an elevation view of the RTO unit of the invention.
Figure 2:
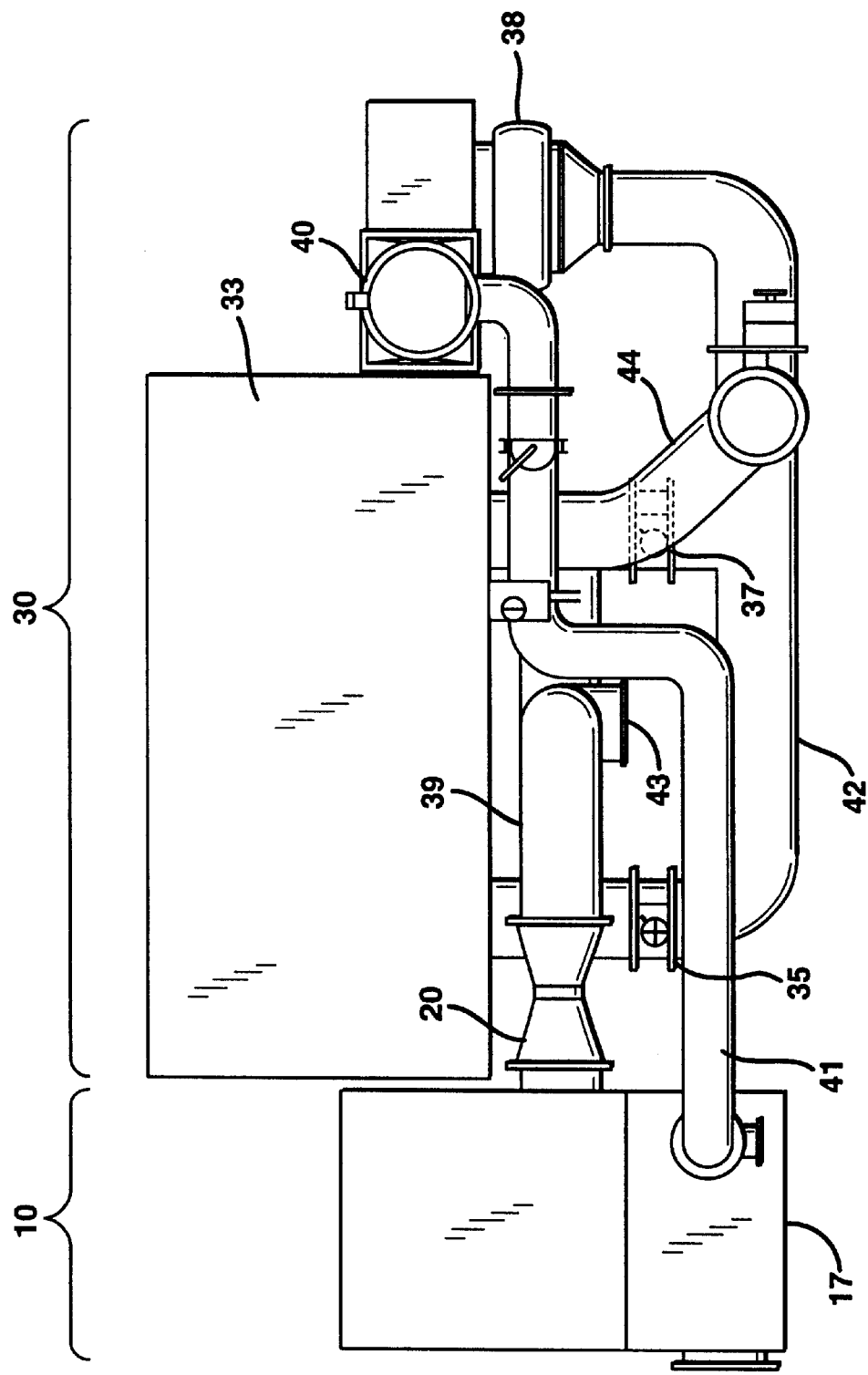
FIG. 2 is a plan view of the RTO unit of the invention.

As shown in FIGS. 1 and 2, the RTO system of the present invention comprises a first stage separator 10 for removing the BD oil from the asphalt vapor stream, and a second stage oxidation unit 30 for thermal oxidation of the VOCs contained in the vapor stream. Between the separator and the oxidation unit is a venturi 20, which acts as a firebreak to prevent vapors in the separator from accidentally igniting and spreading fire back into the asphalt manufacturing or storage facilities.

The separator 10 can be any form of separation equipment that will effectively and reliably remove BD oil from the asphalt vapor stream at variable operating flow rates to permit intermittent use of the RTO system and prevent coking problems in frequent start-up and shut-down modes associated with intermittent use. Preferably, the separator is one that will effectively remove at least 90 percent of the BD oils that would otherwise exist in the vapor stream at the temperature it exits the separator, at flow rates varying from as low as about 0 to as high as the maximum acceptable flow rate for the RTO unit. As one of skill in the art will recognize, the maximum acceptable flow rate for an RTO unit is principally a question of scaling the size of the unit for the particular application and, thus the specific size or particular maximum flow rate of the RTO unit is not intended to limit the present invention. Accordingly, RTO units having maximum flow rates as high as 25,000 cubic feet per minute are envisioned, although maximum flow rates on the order of 15,000, 7,500 or even 1,000 cubic feet per minute may be adequate to satisfy most applications.

Figure 3B:
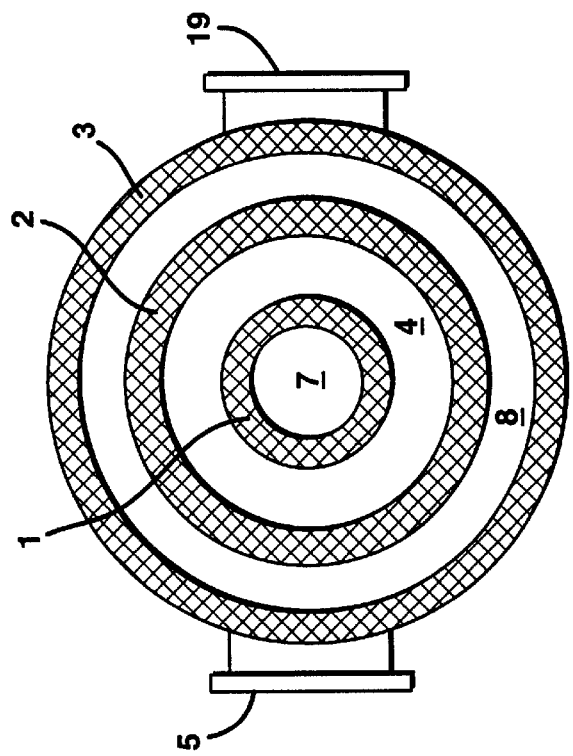
FIG. 3 contains a vertical cross section (a), and a horizontal cross section (b) of an embodiment of a separator useful in the RTO unit.
Figure 3A:
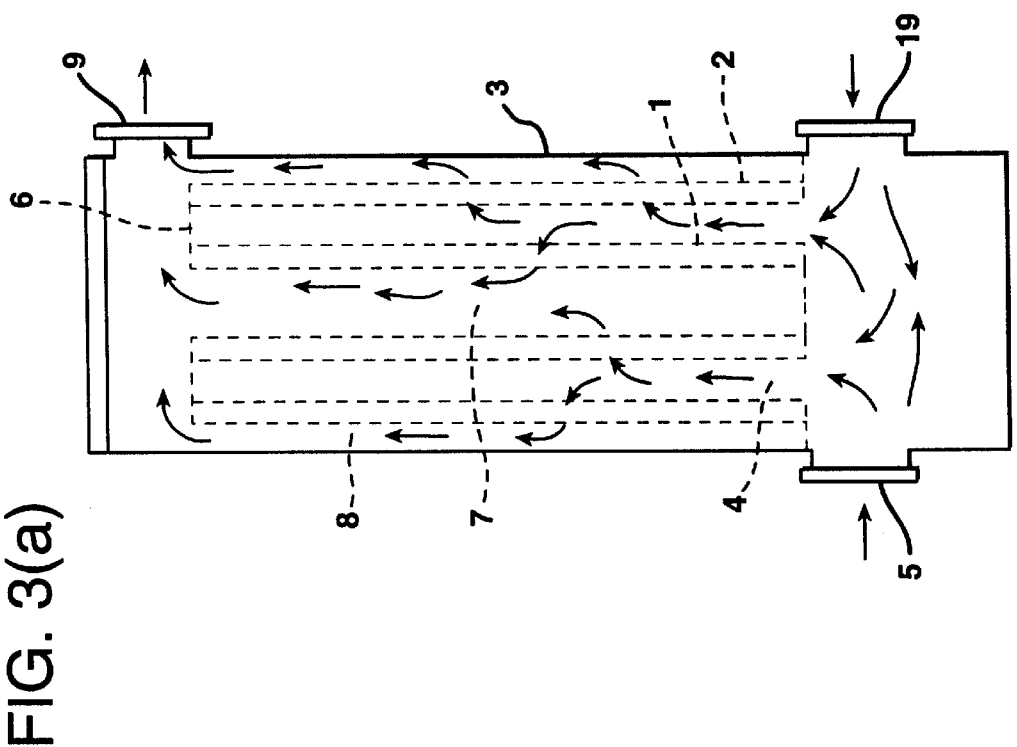
Figure 4:
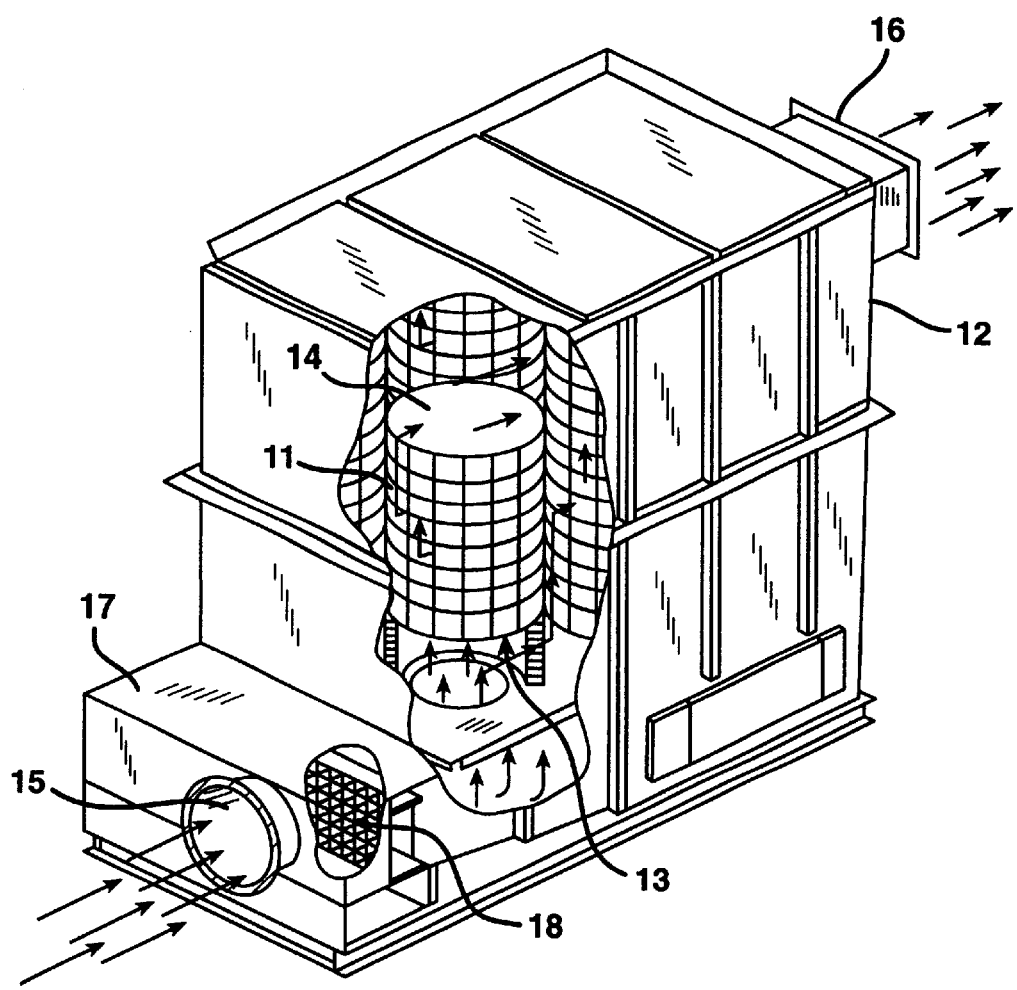
FIG. 4 is a second embodiment of a separator useful in the RTO unit.

A preferred separation device that is effective at removing BD oils over such variable ranges of flow rates is a coalescing fiberbed filter such as those commercially available from Fabric Filters Air Systems, Inc. Such filters have the added advantage that they effectively remove entrained liquids over a wide range of particle sizes. While these filters can take many forms, the arrangements depicted in FIGS. 3 and 4 are particularly effective. However, as one of skill in this art will recognize, additional filter elements can be added to either arrangement to accommodate higher flow rates.

In the embodiment shown in FIG. 3, the vapor stream is filtered by passing it through one of two cylindrical filter elements 1 and 2, arranged in a spaced concentric configuration within a cylindrical shell 3. That is, filter element 1 is of sufficiently smaller diameter than filter element 2 such that it fits inside filter element 2 and leaves an open passage 4 between the filters elements for the flow of unfiltered vapors. Similarly, filter element 2 is of a sufficiently smaller diameter than the shell 3 to form an open passage between it and the shell. The vapors to be filtered enter the filter at inlet 5 which is in flow communication with the annular passage between the two filter elements 4. The annular passage 4 is sealed at the opposite end of the filter 6 such that the vapors entering the annular passage are drawn through the filter elements into the central cylindrical passage 7 or the annular passage 8 between filter element 2 and shell 3, both of which are in flow communication with the outlet for the filtered vapor 9. BD oil contained in the vapor stream is collected in the filter elements and forms droplets which drain from the filter elements and can be collected at the bottom of the filter. Preferably, such liquid oils are drained from the filters frequently during operation via manually or automatically controlled pumping systems.

In the embodiment shown in FIG. 4, the filter comprises a plurality of cylindrical filter elements 11 enclosed within a shell 12. Each filter element is open at one end 13 such that vapor to be filtered can enter the interior cavity defined by the filter element, and is sealed at the opposite end 14 such that the vapors to be filtered must pass through the filter element to exit therefrom. The vapor to be filtered enters the filter at the bottom through inlet 15 and passes into a chamber that is in flow communication with the interior passage of the cylindrical filter elements 11 through their open ends 13. The vapors are drawn through the filter elements and exit the filter through exit 16.

The filter arrangements shown in FIGS. 3 and 4 are exemplary of suitable fiberbed filters for removing BD oils from the asphalt vapor stream. The design shown in FIG. 3 is generally well suited for filtering low to moderate volumes, whereas the design of FIG. 4 is better suited for large volumetric flow rates. While these filters can be used alone to filter the effluent gasses collected for treatment, it is often preferable to prefilter the vapors to remove any particulate material prior to passing the vapors through the fiberbed filter. This can be accomplished by first passing the vapors through one or more prefilters, shown in FIGS. 1, 2 and 4 at 17, which can utilize any suitable filter element 18 for removing particulate matter.

Additionally, when such coalescing filters are utilized in applications where the asphalt vapor throughput can be low, and in geographical areas where ambient temperatures can fall below about 40° F., it is desirable that such filters be heated to prevent solidification of the BD oils on the filter during low flow periods. An effective means for heating the fiberbed filter is to recirculate a portion of the heated effluent from the RTO unit in a recycle loop as shown in FIGS. 1 and 2 at 41. For example, in the embodiment of FIG. 1, recycled effluent from the RTO unit can be added to the unfiltered vapor upstream of the fiberbed filter through inlet 19 shown in FIG. 3.

As shown in FIGS. 1 and 2, the vapor stream exiting the separator 10 passes through venturi 20 prior to entering the oxidation unit 30. The venturi provides protection against flash back into the separator by increasing the velocity of the vapor stream, even at low flow rates, such that it exceeds the flame propagation speed. Additionally, the venturi 20 is preferably equipped with a steam injection port 21 for quenching any fires as a backup should the fan pulling the vapors through the system fail during a flash back.

From the venturi, the vapor stream flows into oxidation unit 30. The oxidation unit is composed of two adjacent heat exchangers 31 and 32, and a combustion chamber 33 that sits on top of the heat exchangers and that is in flow communication therewith. As contaminated flue gas enters the system, it passes through a bed of gridded ceramic blocks in heat exchanger 31. The ceramic blocks preheat the contaminated flue gas close to its burning temperature.

Oxidation takes place in the combustion chamber, where high temperatures destroy the VOC emissions. If the flue gas has a high enough VOC content, the heat produced by oxidation will sustain combustion. If the concentration of contaminants is too low to sustain combustion, additional heat is provided by one or more electrical heating elements within the combustion chamber. Thus, as the VOC concentration of the vapor increases, the electric heat requirement decreases. Preferably, the temperature in the combustion chamber is maintained at from about 1450 to 1550° F. more preferably from about 1475 to 1500° F.

The cleaned flue gas exits the combustion chamber through heat exchanger 32. As the hot gas passes through the bed of gridded ceramic blocks contained in heat exchanger 32, its heat is transferred to the ceramic blocks. At a predetermined time, or when the difference in the temperature between the ceramic blocks in heat exchanger 31 and the ceramic blocks in heat exchanger 32 reaches a predetermined value, the inlet gas flow is switched to heat exchanger 32 such that the incoming contaminated flue gas passes through the heated blocks of heat exchanger 32 and the heated blocks transfer their stored heat to the incoming gas. The clean gas then exits through heat exchanger 31. Thereafter, at the predetermined time interval, or when the difference in temperature between the blocks in heat exchanger 32 and the blocks in heat exchanger 31 reaches the predetermined value, the inlet gas is once again switched back to heat exchanger 31 and the process is repeated. Typically, the direction of gas flow through the oxidation unit is switched at time intervals of from about 0.5 to 2 minutes. However, in order to control sporadic fluctuations in the temperature of the heat exchangers, it is generally preferred to have a control mechanism that will switch the gas flow at times other than the predetermined interval whenever the temperature difference between the heat exchangers becomes more than about 200° F.

The flow of the vapor stream through the heat exchangers and the combustion chamber is controlled by inlet valves 34 and 36, and outlet valves 35 and 37, of heat exchangers 31 and 32. These valves may be of any type commonly used to regulate the flow of vapors, but are preferably electrically controlled. The vapors to be cleaned are drawn through the oxidation unit by fan 38. The vapors enter the oxidation unit via duct 39 which splits with one end terminating at the inlet to heat exchanger 31 and the other end terminating at the inlet to heat exchanger 32. Valves 34 and 36 located adjacent to the inlets to heat exchangers 31 and 32, respectively, control the flow of the uncleaned vapor into the heat exchangers. Similarly, the cleaned vapor exits the oxidation unit through a common duct 42 connecting fan 38 to the outlets of heat exchangers 31 and 32. Valves 35 and 37 located adjacent to the outlets of heat exchangers 31 and 32, respectively, allow the flow of the cleaned vapor out through the heat exchangers. As will be apparent to one skilled in this art, the inlet and outlet of each heat exchanger can be separate openings or the same opening. Where the inlet and outlet are the same opening, the inlet duct and outlet duct converge, such as through a T or Y fitting, prior to joining with the inlet/outlet opening of the heat exchanger. In such configurations, the inlet and outlet valves are located in the respective inlet and outlet ducts adjacent the location where they converge.

By closing valve 36 at the inlet and opening valve 37 at the outlet to heat exchanger 32, while opening valve 34 at the inlet and closing valve 35 at the outlet to heat exchanger 31, the vapors are drawn through the inlet of heat exchanger 31, through the combustion chamber 33, through the outlet of heat exchanger 32 and are finally vented to the atmosphere through stack 40. By reversing the orientation of valves 34, 35, 36 and 37, the direction of gas flow will be reversed such that the vapors are drawn through the inlet of heat exchanger 32, through the combustion chamber 33 and then out through the outlet of heat exchanger 31 before being vented to the atmosphere through stack 40.

As mentioned above, when a fiberbed filter is used as the separator in an environment where ambient temperatures can fall below about 40° F., a portion of the effluent from the oxidation unit is desirably recycled through the filter via duct 41 to prevent the filter from freezing. Additionally, depending on the VOC content of the effluent stream being treated, it may also be desirable to dilute the incoming stream to the oxidation unit with air, or to vent some of the heated gas from the combustion chamber directly to the exhaust duct, to regulate the temperatures reached in the combustion chamber. To accommodate such desires, the oxidation unit may optionally include a dilution air intake 43 and an exhaust bypass 44 as shown in FIGS. 1 and 2.

The effectiveness of the above described RTO system on reducing VOC emissions associated with the manufacture of asphalt materials is exemplified by the results of emissions monitoring of a truck loading recovery system set forth in Table 1. As this data indicates, the RTO system of the present invention is capable of destroying up to about 99% of the total hydrocarbon contained in the asphalt vapors without the formation of excessive quantities of sulfur dioxide or nitrous oxides.

TABLE 1

Averages of Continuous Emissions Monitoring During Truck Loadings

| INLET | Day 1 | Day 2 | Day 7 | Day 8 |
|---|---|---|---|---|
| Gas Conditions | | | | |
| $T_3$ Temperature (° F.) | 84 | 65 | 91 | 86 |
| $O_2$ Oxygen (dry volume %) | 20.9 | 20.9 | 20.9 | 20.9 |

TABLE 1-continued

Averages of Continuous Emissions Monitoring During Truck Loadings

| INLET | Day 1 | Day 2 | Day 7 | Day 8 |
|---|---|---|---|---|
| $CO_2$ Carbon Dioxide (dry volume %) | 0.0 | 0.0 | 0.0 | 0.0 |
| $B_{wo}$ Moisture (volume %) | 2.40 | 2.08 | 2.22 | 2.53 |
| $O_{std}$ Standard conditions (dscfm) | 700 | 597 | 562 | 689 |
| Total Hydrocarbons as propane | | | | |
| C Concentration (ppmdv) | 388.3 | 842.4 | 801.4 | 1,218 |
| E Emission rate (lb/hr) | 1.88 | 3.47 | 3.08 | 4.94 |
| Nitrogen Oxides | | | | |
| C Concentration (ppmdv) | 0.0 | 1.1 | 0.5 | 0.5 |
| E Emission rate (lb/hr) | 0.00 | 0.00 | 0.00 | 0.00 |
| Sulfur Dioxide | | | | |
| C Concentration (ppmdv) | 11.8 | 8.1 | 2.4 | 7.9 |
| E Emission rate (lb/hr) | 0.09 | 0.05 | 0.01 | 0.05 |
| OUTLET | | | | |
| Gas Conditions | | | | |
| $T_3$ Temperature (° F.) | 172 | 164 | 154 | 201 |
| $O_2$ Oxygen (dry volume %) | 20.6 | 20.3 | 20.2 | 20.2 |
| $CO_2$ Carbon Dioxide (dry volume %) | 0.4 | 0.6 | 0.5 | 0.5 |
| $B_{wo}$ Moisture (volume %) | 2.26 | 2.20 | 2.23 | 2.62 |
| $O_{std}$ Standard conditions (dscfm) | 848 | 745 | 600 | 693 |
| Total Hydrocarbons as propane | | | | |
| C Concentration (ppmdv) | 13.9 | 7.6 | 19.7 | 24.1 |
| E Emission rate (lb/hr) | 0.08 | 0.04 | 0.08 | 0.11 |
| Nitrogen Oxides | | | | |
| C Concentration (ppmdv) | 0.0 | 0.7 | 0.0 | 0.0 |
| E Emission rate (lb/hr) | 0.00 | 0.00 | 0.00 | 0.00 |
| Sulfur Dioxide | | | | |
| C Concentration (ppmdv) | 85.7 | 230.9 | 226.0 | 220.5 |
| E Emission rate (lb/hr) | 0.74 | 1.78 | 1.35 | 1.63 |
| Carbon Monoxide | | | | |
| C Concentration (ppmdv) | 11.7 | 16.3 | 10.4 | 9.7 |
| E Emission rate (lb/hr) | 0.04 | 0.05 | 0.03 | 0.03 |
| THC DESTRUCTION EFFICIENCY (%) | 93.66 | 98.88 | 97.19 | 97.60 |

What is claimed is:

1. A process for reducing the content of volatile organic components in an asphalt vapor stream comprising:
    (a) collecting the vapors emanating from said asphalt;
    (b) removing condensable blowing distillate oils contained therein by passing said vapors through a coalescing filter; and
    (c) oxidizing the volatile organic compounds contained in said vapor.

2. The process of claim 1, wherein said blowing distillate oils are removed by passing said vapors through a fiberbed filter.

3. The process of claim 2, wherein said volatile organic components are oxidized by passing said vapors through a regenerative thermal oxidation unit.

4. The process of claim 3, wherein said vapors are heated to a temperature of from about 1450 to 1550° F. in said oxidation unit.

5. A process for reducing the content of volatile organic components in an asphalt vapor stream comprising:
    (a) collecting the vapors emanating from said asphalt;
    (b) removing condensable blowing distillate oils contained therein by passing said vapors through a coalescing filter;
    (c) oxidizing the volatile organic compounds contained in said vapor; and (d) recirculating a portion of the oxidized vapor to said coalescing filter.

6. The process of claim 5, wherein said oxidized vapor is recirculated through a recycle loop.

7. The process of claim 6, wherein said recycle loop extends from a stack to said coalescing filter.

8. The process of claim 5, wherein said coalescing filter is heated by the recirculated oxidized vapor.

9. The process of claim 8, wherein said coalescing filter is heated to prevent the solidification of blowing distillate oil.

10. A process for reducing the content of volatile organic components in an asphalt vapor stream comprising:
   (a) collecting the vapors emanating from said asphalt;
   (b) removing condensable blowing distillate oils contained therein by passing said vapors through a separator;
   (c) oxidizing the volatile organic compounds contained in said vapor; and
   (d) recirculating a portion of the oxidized vapor to said separator.

11. The process of claim 10, further comprising providing a firebreak.

12. The process of claim 2, wherein said firebreak is positioned between the separator and an oxidation system.

13. A process for reducing the content of volatile organic components in an asphalt vapor stream comprising:
   (a) collecting the vapors emanating from said asphalt;
   (b) removing particulate matter contained in said vapors by passing said vapors through a particulates filter;
   (c) removing condensable blowing distillate oils contained in said vapors by passing said vapors through a coalescing filter; and
   (d) oxidizing the volatile organic compounds contained in said vapors.

14. The process of claim 13, wherein said step of removing particulate matter from said vapors is conducted before said step of removing blowing distillate oils from said vapors.

15. The process of claim 13, wherein said blowing distillate oils are removed by passing said vapors through a fiberbed filter.

16. The process of claim 15, wherein said step of removing particulate matter from said vapors is conducted before said step of removing blowing distillate oils from said vapors.

17. The process of claim 14, wherein said step of removing particulate matter comprises removing large particles from the vapors.

* * * * *